US005353050A

United States Patent [19]

Kagayama

[11] Patent Number: 5,353,050

[45] Date of Patent: Oct. 4, 1994

[54] RECORDING ELECTRODE FOR MULTICOLOR RECORDING

[75] Inventor: Shigeru Kagayama, Owariasahi, Japan

[73] Assignee: Brother Kogyo Kabushiki Kaisha, Nagoya, Japan

[21] Appl. No.: 947,396

[22] Filed: Sep. 21, 1992

[30] Foreign Application Priority Data

Nov. 6, 1991 [JP] Japan .................................. 3-289922

[51] Int. Cl.$^{5}$ .............................................. G01D 15/16

[52] U.S. Cl. ...................................... 347/55; 346/157; 346/159

[58] Field of Search .................... 346/140 R, 159, 157

[56] References Cited

U.S. PATENT DOCUMENTS

| | | | |
|---|---|---|---|
| 3,589,283 | 6/1971 | Childress | 177/159 |
| 3,689,935 | 9/1972 | Pressman et al. | 346/159 |
| 4,611,219 | 9/1986 | Sugitani | 346/140 R |
| 4,733,256 | 3/1988 | Salmon | 346/157 |
| 4,777,500 | 10/1988 | Salmon | 346/157 X |
| 4,912,489 | 3/1990 | Schmidlin | 346/159 |
| 4,999,653 | 3/1991 | McCallum | 346/159 |
| 5,132,712 | 7/1992 | Fletcher et al. | 346/159 |
| 5,200,769 | 4/1993 | Takemura et al. | 346/140 R |
| 5,283,594 | 1/1994 | Iwao | 346/159 |

FOREIGN PATENT DOCUMENTS

| | | |
|---|---|---|
| 2-137946 | 5/1990 | Japan . |
| 3-30213 | 2/1991 | Japan . |

*Primary Examiner*—Benjamin R. Fuller
*Assistant Examiner*—Randy W. Gibson
*Attorney, Agent, or Firm*—Oliff & Berridge

[57] ABSTRACT

The invention relates to a recording electrode capable of forming a color image by directly controlling charged toner particles. The recording electrode comprises a plurality of apertures for each color in one substrate. The apertures can be accurately positioned so that a good image is output. The toner particles for each color perfectly overlap each other on a paper because of the accurate aperture positioning. Moreover, since driving circuits for each color are commonly used, it is possible to reduce the cost of the apparatus.

10 Claims, 4 Drawing Sheets

RECORDING ELECTRODE FOR MULTICOLOR RECORDING

BACKGROUND OF THE INVENTION

1. Field of the Invention

The invention relates to a recording electrode which is employed in a copier and a printer capable of printing an image by directly controlling a flow of charged toner particles, more particularly, to a recording electrode for recording an image with various colors.

2. Description of Related Art

A conventional image recording apparatus which employs a recording electrode is disclosed in Japanese Laid-Open Patent Publication No. 2-137946 and U.S. Pat. No. 3,689,935. In the image recording apparatus, the recording electrode has a plurality of apertures and charged toner particles can pass through each of the apertures. The image recording apparatus is capable of directly controlling the charged toner particles in order to record an image.

On the other hand, an image recording apparatus which employs at least three of the above-mentioned recording electrodes and is capable of outputting a full color image, is disclosed in the specification and drawings of Japanese Patent Application No. 3-30213. In the disclosed image recording apparatus, three recording units each storing one of three colors of toner particles, that is, yellow, magenta, and cyanogen, therein are provided in order along a feeding course of a supporting medium to have an image recorded thereon. Each of the recording units comprises a recording electrode having a plurality of apertures for allowing charged toner particles to pass therethrough and a toner particle supplying portion for carrying toner particles toward the neighborhood of these apertures of the recording electrode.

However, there are problems in the image recording apparatus having the above-mentioned structure. First, there is a need to arrange each recording electrode of the three recording units in an accurate position with respect to a feeding direction of a supporting medium. If the three recording units are not accurately positioned, each electrode of the three recording units gets out of position, respectively. Then, even if toner particles pass through an appropriate aperture at an appropriate time, the toner particles of the three colors cannot be perfectly overlapped with each other. As a result, a bad quality image is formed on the supporting medium. To solve this problem, the user or service technician has to accurately position the three recording units in a perpendicular direction and in a parallel direction with respect to the feeding direction of the supporting member, that is, he/she has to accurately position the recording electrodes. However, it is very difficult for the him/her to accurately position each electrode of the three recording units. Further, he/she takes a lot of time for this operation.

SUMMARY OF THE INVENTION

It is therefore an object of the invention to provide a recording electrode wherein a plurality of apertures through which each color toner particles can pass are accurately positioned and, thereby, the toner particles of various colors can be perfectly overlapped with each other so that a good quality image is output.

In order to carry out the purpose of the invention, the recording electrode of the invention comprises: a substrate having an insulative characteristic, the substrate having a plurality of apertures which allow charged particles to pass therethrough, the charged toner particles for each of at least two colors passing through the individual apertures, the recording electrode being used for directly controlling the charged particles such that the toner particles are passed through the apertures in order to record an image on a supporting medium fed in a predetermined direction.

According to the invention having the described structure, since a plurality of individual apertures for each of the least two colors are provided on the one substrate, the apertures for each color are accurately positioned as corresponding to each other. Because of this, a good image can be produced as toner particles for each color are perfectly overlapped with each other.

BRIEF DESCRIPTION OF THE DRAWINGS

A preferred embodiment of the invention will be described in detail with reference to the following figures in which.

DETAILED DESCRIPTION OF THE PREFERRED EMBODIMENT

Hereinafter an embodiment of the invention will be explained with reference to the figures.

Figure 1:
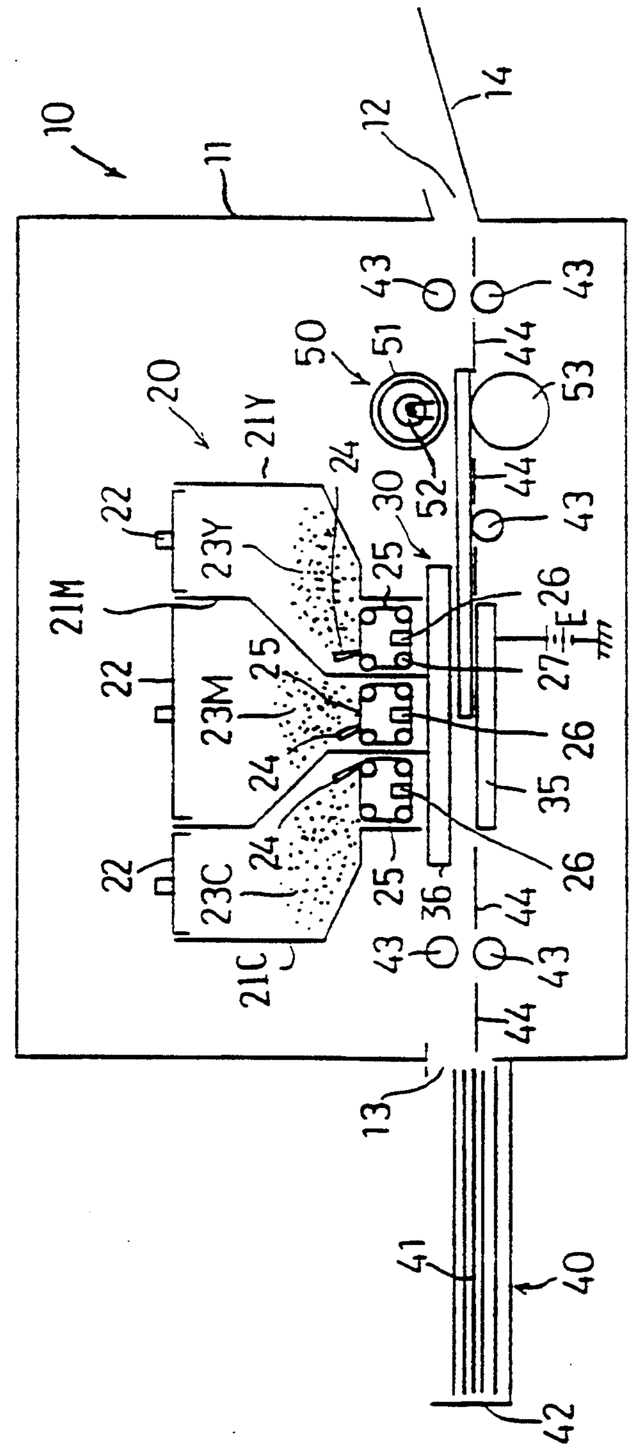
FIG. 1 is a schematic view of an image recording apparatus employing a recording electrode of the invention.

First, the structure of the image recording apparatus employing the aperture electrode 36 of the invention will be explained with reference to FIG. 1. On opposite sides of a frame 11, of the image recording apparatus 10, a paper supplying portion 13 and a paper discharge portion 12 are provided, respectively. The paper supplying portion 13 is used for inserting a paper 41 into the main body 10. Detachably mounted at the paper supplying portion 13 is a cassette 42 which stores a stack of paper 41. The paper 41 in the cassette 42 is inserted one sheet after another into the main body 10 through the paper supplying portion 13 by a paper take-up device (not shown). A paper feeding portion 40 comprises the cassette 42, feeding rollers 43, to be described later, and a paper feeding guide 44.

A paper 41 on which an image is formed is discharged from the main body 10 through the paper discharge portion 12. A discharge tray 14 on which the paper 41 is received is located under the paper discharge portion 12.

Generally, a toner particle supply portion 20, an image forming portion 30, a part of the paper feeding portion 40 and a thermal fixing portion 50 are provided inside of the image recording apparatus 10.

The toner particle supply portion 20, comprising three toner particle casings 21C, 21M and 21Y, is provided near the center of the main body 10. The three toner particle casings 21C, 21M and 21Y are provided in order along a paper feeding direction. The toner particle casing 21C stores cyanogen toner particles 23C, the toner particle casing 21M stores magenta toner particles 23M and the toner particle casing 21Y stores yellow toner particles 23Y. A full color image is formed with these three colors, that is toner particles 23C, 23M and 23Y. The toner particles 23C, 23M and 23Y are made of similar materials, such as styrene-acrylic toner particles and polyester toner particles. The toner particles 23 become generally negatively charged. Moreover, each of the toner casings 21C, 21M and 21Y has cover 22. The covers 22 are used for covering the toner casings 21C, 21M and 21Y to prevent the entry of trash and/or dust.

Under each of the toner particle casings 21C, 21M and 21Y is a toner particle supply device. Each toner particle supply device comprises a charge blade 24, a feeding belt 25, a vibrator 26 and four driving rollers 27. The four driving rollers 27 are controlled to rotate by a CPU 61 through a driving circuit 72.

The feeding belt 25 is wound around the four driving rollers 27 and revolves as the four driving rollers 27 rotate. The feeding belt 25 is made from nickel alloy. However, the feeding belt 25 may be made from any appropriate material that permits the feeding belt 25 to be made thin yet able to bear certain tension.

The charge blade 24 is disposed above the feeding belt 25 in a very close relationship and is made from a member having a positive charge property, such as nylon, in order to negatively charge the toner particles 23C, 23M and 23Y. Accordingly, as the feeding belt 25 revolves, the toner particles 23 on the feeding belt 25 come in contact with the charge blade 24. At this time, friction is caused between the charge blade 24 and the toner particles 23. Since the charge blade 24 is made from the member having a positive charge property, the toner particles 23 become negatively charged. Moreover, the toner particles 23 carried on the feeding belt 25 are levelled to a smooth surface with a uniform thickness by the charge blade 24.

The vibrator 26 is positioned to contact the feeding belt 25 in an opposing relationship to an aperture electrode 36 to be described later. That is, the vibrator 26 is positioned on the reverse side of feeding belt 25 on which toner particles 23 are carried. The vibrator 26 is made of a piezoelectric member such as PZT. When an electric current is sent by a driving circuit 71, the vibrator 26 vibrates against the feeding belt 25 to shake the charged toner particles 23 from the feeding belt 25. As a result, the toner particles 23 form a toner particle cloud above the aperture electrode 36.

Figure 2:
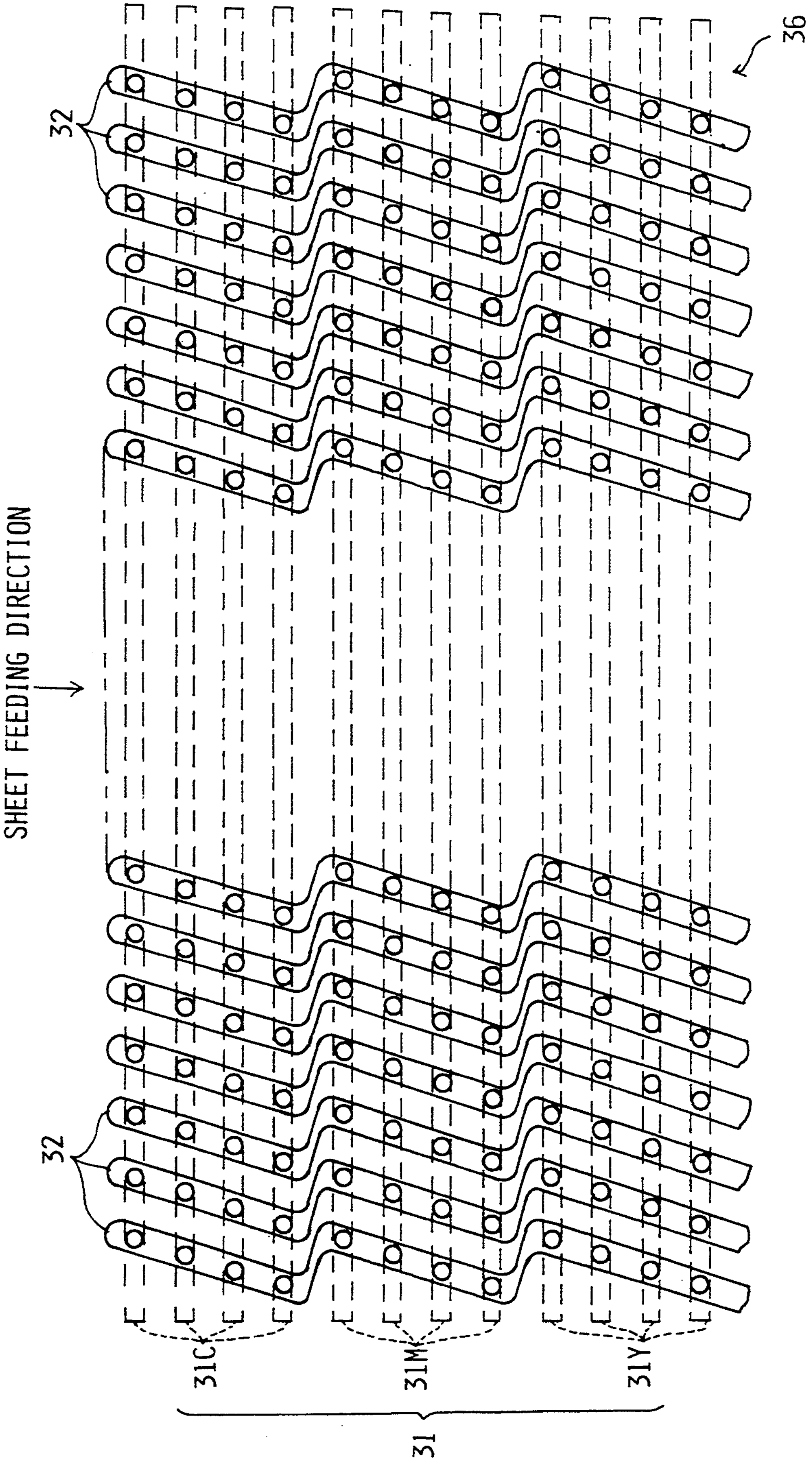
FIG. 2 is a view showing the data electrodes and the scan electrodes of the recording electrode of the invention.
Figure 3:
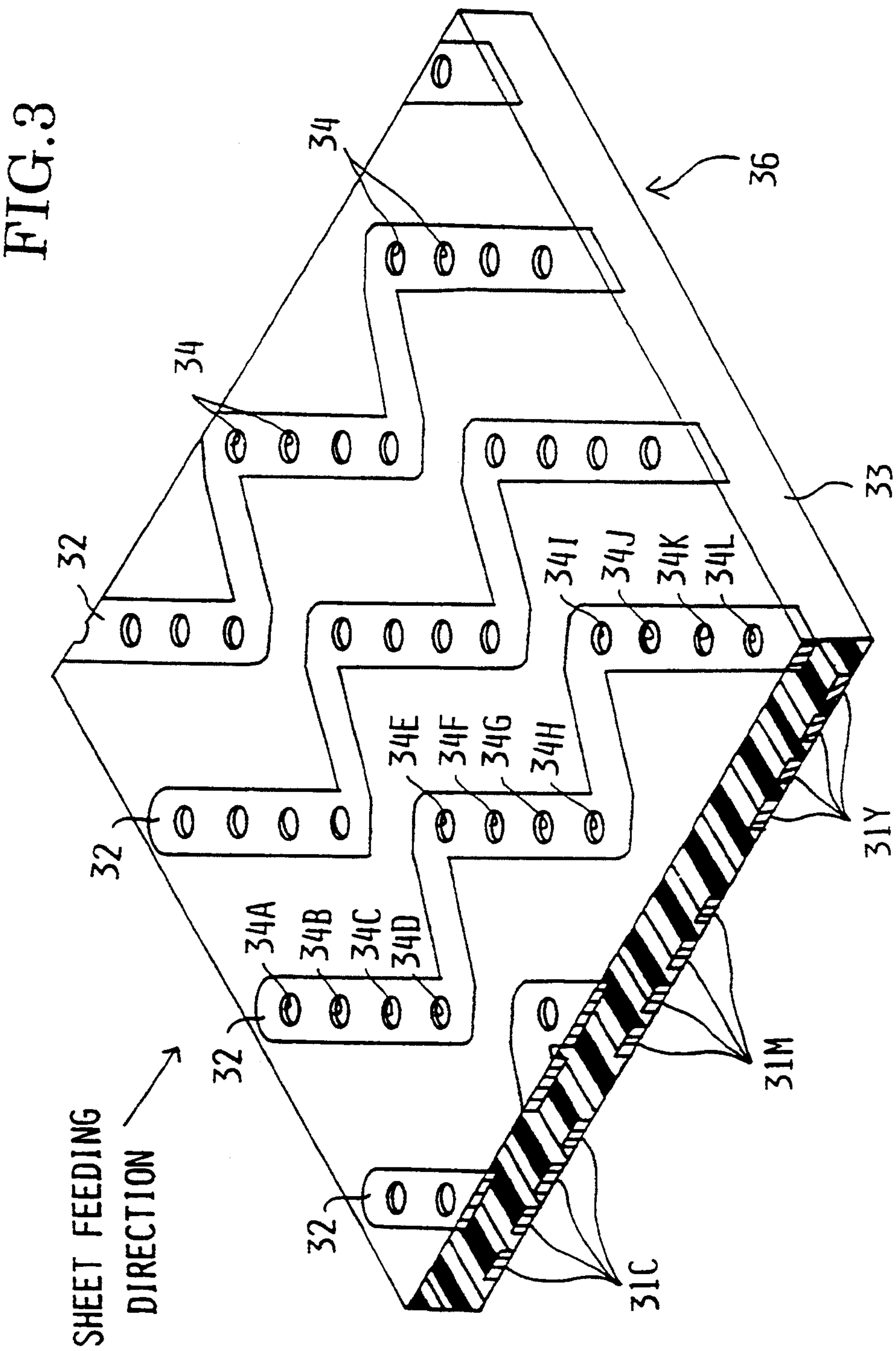
FIG. 3 is a partial perspective view showing the recording electrode of the invention.

The image forming portion 30 comprises the aperture electrode 36 and a back electrode 35. The structure of the aperture electrode 36 of the present embodiment will be explained with reference to FIGS. 2-3. The aperture electrode 36 has scan electrodes 31C, 31M and 31Y for the three colors, such as yellow, magenta and cyanogen, a plurality of data electrodes 32 and a substrate 33.

In the present embodiment, the substrate 33 is a polyimide film having a few tens of μm thickness, such as a range from 10 to 90 μm, and may be made of a ceramic material such as alumina or zirconia. By the lithographic method or the etching method, the data electrodes 32 are formed on one side of the substrate 33 and the scan electrodes 31 are formed on the reverse side thereof in an almost transverse, or crossed, relationship with each other. Thus, the aperture electrode 36, wherein the scan electrodes 31 and the data electrodes 32 are accurately positioned with extremely precise interval therebetween, is formed. In the invention, where a plurality of electrodes for various colors are formed on one substrate, the above-described structure is effective. An aperture 34, which passes through the substrate 33, is formed to correspond with the vertical intersection of the scan electrode 31 and the data electrode 32. The diameter of the aperture 34 is about 80 μm.

The scan electrodes 31 are arranged on one side of the substrate in parallel. Similarly, the data electrodes 32 are arranged on the reverse side of the substrate in parallel so that together they define a matrix.

In the present embodiment, to get 300DPI (dots per inch) resolution, the scan electrodes 31 for each color, such as yellow, magenta and cyanogen, are arranged in four lines. That is, in total, twelve lines of scan electrodes 31 are provided. There must be at least one scan electrode for each color. To match the colors to the scan lines, there is a wall between each toner casing 21 that corresponds to the break between the scan lines devoted to the adjacent colors. Moreover, on each data electrode 32, twelve apertures, corresponding to the scan electrodes 31, are provided. Therefore, the toner particles for each color, such as cyanogen, magenta and yellow, can pass through four individual apertures, respectively. For instance, the cyanogen toner particles 23C pass through apertures 34A~34D, the magenta toner particles pass through apertures 34E~34H, the yellow toner particles 23Y pass through apertures 34I~34L. Each of the four apertures for each color are arranged along a straight line having a predetermined angle with respect to the feeding direction of the paper 41.

Further, when each of the different color toner particles pass through the individual apertures, the positions on the paper for each aperture of each color, that is in a corresponding position to the color's other apertures, lie in a straight line that is parallel to the feeding direction of the paper 41. In other words, the different color toner particles pass through, respectively, apertures 34A, 34E and 34I which have a position corresponding to one another. Moreover, apertures 34B, 34F and 34J are arranged on a second straight line which is parallel to the feeding direction of the paper 41, and apertures 34C, 34G and 34K, and apertures 34D, 34H and 34L are arranged in a similar manner as described above.

The scan electrodes 31 are connected to a scan electrode driving circuit 66. The scan electrode driving circuit 66 can apply a positive voltage of 50V to any one of the twelve scan electrodes 31 and can apply a 0 voltage to the others, that is, the other eleven scan electrodes 31. Each scan electrode 31 has applied thereto the voltage of 50V in sequence at a predetermined cycle rate or time.

To explain this operation, the twelve electrodes 31 are designated as scan electrodes A~L. When the scan electrode A is applied the voltage of 50V, the others, that is, scan electrodes B~L, are applied a 0 voltage. After a predetermined time elapses, the scan electrode B is applied the voltage of 50V and the others, that is, the scan electrode A and the scan electrodes C~L are applied the 0 voltage. After the predetermined time elapses, the scan electrode C is applied the voltage of 50V, and the others, that is, the scan electrodes A, B and the scan electrodes D~L, are applied the 0 voltage. As mentioned above, only one scan electrode 31 out of the twelve scan electrodes 31 is applied the voltage of 50V at any one time, and the scan electrode 31 to which the voltage of 50V is applied has the 50V voltage applied in sequence.

The data electrodes 32 are connected to a data electrode driving circuit 67. The data electrode driving circuit 67 applies a positive voltage of 25V or 75V to the data electrodes 32 based on an image data input from the outside.

Back electrode 35 is disposed opposite to the aperture electrode 36 with a predetermined interval therebetween. The fed paper 41 can pass through this interval. The toner particles 23, which passed through the apertures 34 of the aperture electrode 36, are attracted to the back electrode 35. As a result, they are attached to the paper 41, passing between the aperture electrode 36 and the back electrode 35, so that a toner particle image is formed on the paper 41. To attract the toner particles 23, the back electrode 35 is connected to a high voltage power supply E and is always applied the voltage of +1kV.

As described above, the paper feeding portion 40 comprises the cassette 42, the feeding rollers 43 and the paper feeding guide 44. The feeding rollers 43 and the paper feeding guide 44 are provided inside of the image recording apparatus 10. The feeding rollers 43 are driven to rotate by the CPU 61 through a driving circuit 68. The paper 41 is fed in a predetermined direction by being held between the pair of feeding rollers 43 or by coming in contact with the one feeding roller 43. The paper feeding guide 44 supports and guides the paper 41 toward the paper discharge portion 12.

The thermal fixing portion 50 comprises a heat roller 51 having a heater 52 therein and a pressure roller 53. The heat roller 51 is driven to rotate by the CPU 61 through a driving circuit 70. The heater 52 is driven to generate heat by the CPU 61 through a driving circuit 69. The thermal fixing portion 50 processes the paper 41 on which the toner particle image is formed by the aperture electrodes 36 and the back electrode 35. That is, the paper 41 is passed between the heat roller 51 and the pressure roller 53. Then, the heater 52 heats the paper 41 in order to fix the toner particles image onto the paper 41.

Figure 4:
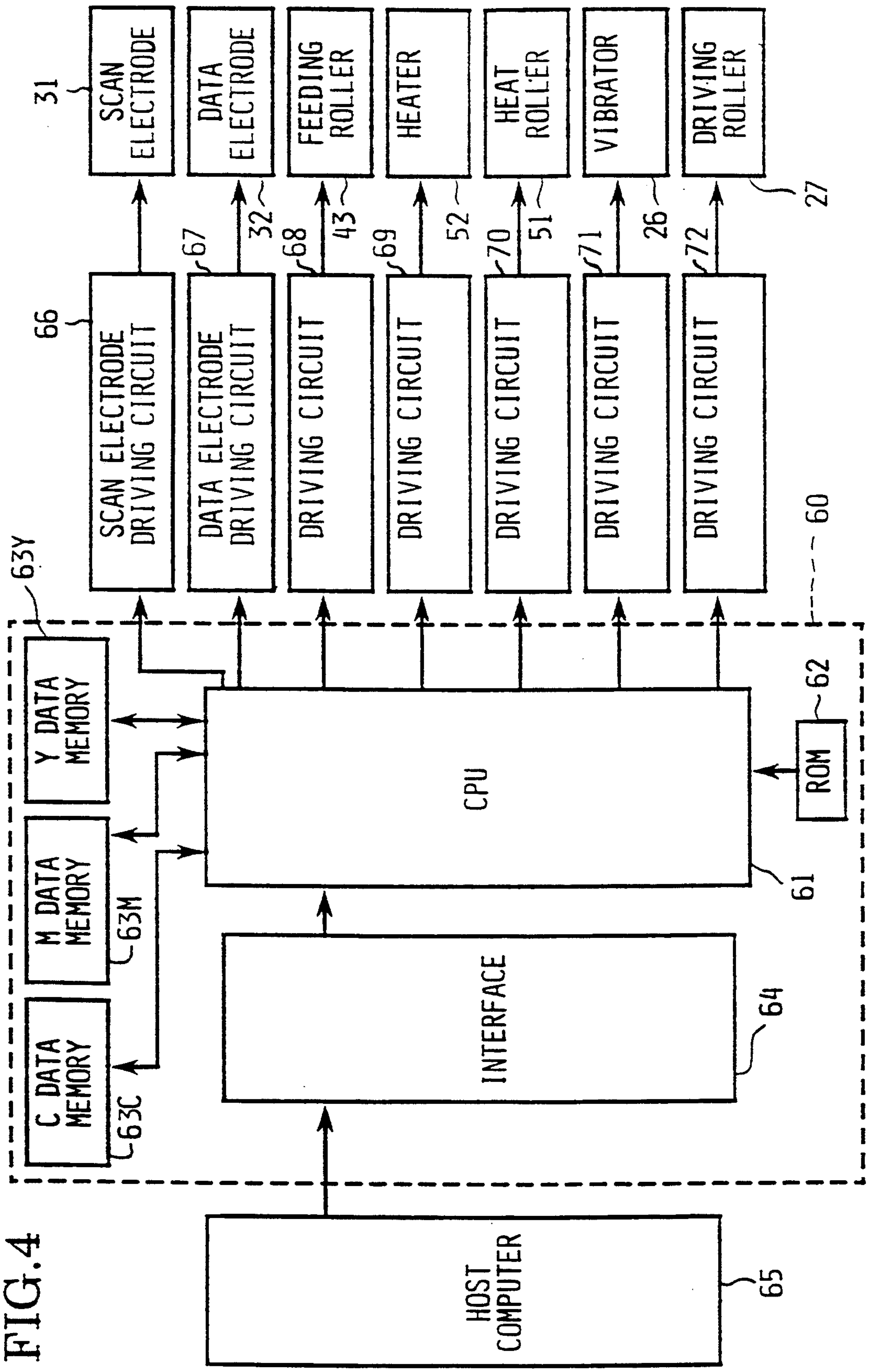
FIG. 4 is a block diagram showing the electrical structure of the image recording apparatus employing the recording electrode of the invention.

The electrical structure of the image forming apparatus of the present embodiment will be explained with reference to FIG. 4. The control portion 60 comprises the CPU (Central Processing Unit) 61, a ROM (Read Only Memory) 62, each data memory 63C, 63M and 63Y for cyanogen, magenta and yellow, and an input interface 64. The ROM 62 stores dot patterns corresponding to character codes, a print processing program, a program which is used when the CPU 61 controls each member, and data for the control operation.

Each data memory 63C, 63M and 63Y temporarily stores image data, corresponding to each color, therein, respectively. The image data is input from a host computer 65 which is an external device.

The host computer 65 is connected to the interface 64. The data from the host computer 65 is input into the CPU 61 through the interface 64.

The CPU 61 executes the print processing program and the control program stored in the ROM 62. Moreover, the image data of character codes and control codes are input into the CPU 61 from the host computer 65 and the various driving circuits 66, 67, 68, 69, 70, 71 and 72 are connected to the CPU 61. Further, the scan electrodes 31, the data electrodes 32, the feeding rollers 43, the heater 52, the heat roller 51, the vibrators 26 and the driving rollers 27 are connected to driving circuits 66, 67, 68, 69, 70, 71 and 72, respectively. The scan electrode driving circuit 66 is connected to the twelve scan electrodes 31 and applies the voltage of 50V to one scan electrode 31 and applies the 0 voltage to the others such that each scan electrode 31 is applied the voltage of 50V in sequence over time. The data electrode driving circuit 67 is connected to all data electrodes 32 and independently applies the voltage of 25V or 75V to each data electrode 32 based on the image data.

The image recording apparatus of the present embodiment operates as described below.

When the image data is input into the image recording apparatus 10, from the external host computer 65, the CPU 61 decomposes the image data into data for cyanogen, data for magenta and data for yellow. Each of these data is temporarily stored into the cyanogen data memory 63C, the magenta data memory 63M and the yellow data memory 63Y, respectively.

Next, the CPU 61 drives the paper take-up device (not shown) such that the paper take-up device takes up the uppermost paper 41 from the stack of papers 41 stored in the cassette 42 and inserts the paper 41 into the main body 10.

Further, the CPU 61 drives the driving circuit 68 in order to drive the feeding rollers 43 so that the feeding rollers 43 feed the paper 41 toward the aperture electrode 36 in cooperation with the paper feeding guide 44.

On the other hand, the CPU 61 drives the driving roller circuit 72 such that the driving rollers 27 rotate for each of the color toner particles 23C, 23M and 23Y in each of the toner particle casings 21C, 21M and 21Y. As a result, color toner particles 23C, 23M and 23Y are carried on their respective feeding belts 25 and the toner particles are negatively charged by the friction caused by the charge blades 24. After this, the CPU 61 drives the driving rollers 27 such that the negatively charged toner particles 23 on each of the feeding belts 25 are fed to a position confronting the aperture electrode 36. The CPU 61 then vibrates each of the vibrators 26, each of which contacts the reverse side of an associated one of the feeding belts 25, through the driving circuit 71. The charged toner particles 23 are shaken from the belt 25 by the vibration and are supplied, above the aperture electrode 36, as a toner particle cloud.

Next, the CPU 61 drives the scan electrode driving circuit 66 such that the scan electrode 31 which is most upstream of the four scan electrodes 31C is applied the voltage of 50V and the other scan electrodes 31C, 31M and 31Y are keep at 0V. The CPU 61 reads the image data from the cyanogen data memory 63C and applies the voltage of 25V or 75V to each data electrode 32 based on the image data. If the apertures of the scan electrode, which is applied the voltage of 50V, correspond to the apertures of the data electrodes 32 to which are applied the voltage of 25V, electric lines of force which go from the scan electrode side to the data electrode side are formed in the apertures. Therefore, the negatively charged toner particles 23C are attracted from the data electrode side to the scan electrode side. Further, the toner particles 23C are drawn onto the paper 41 according to the electric field formed by the back electrode 35 to which is applied 1kV.

At this time, a dot line composed of dots formed with toner particles 23C forms the first dot line. Therefore, even if the CPU 61 applies in sequence the voltage of 50V to the remaining eleven scan electrodes 31C, 31M and 31Y, all the corresponding data electrodes 32 are applied the voltage of 75V as there is no image data.

That is, downstream from the first dot line, the toner particles do not fly onto the paper 41. After all the scan electrodes 31 are applied the voltage of 50V in sequence, the CPU 61 drives the feeding rollers 43, through the driving circuit 68, such that the paper 41 is fed toward the paper feeding direction a distance equal to one dot pitch.

Again, the CPU 61 drives the scan electrode driving circuit 66 such that the scan electrode 31 which is provided on the most upstream position out of the twelve scan electrodes 31 is applied the voltage of 50V. The CPU 61 applies the voltage of 25V or 75V to each of the data electrodes 32 based on the image data which is read from the data memories 63C, 63M and 63Y. The CPU 61 then applies, in sequence, a voltage of 50V to the remaining 11 scan line electrodes 31C, 31M and 31Y and, since the paper has advanced a distance equal to one dot pitch, the voltage of 25V or 75V is applied to each of the data electrodes based on the image data which is read from the data memories 63C, 63M and 63Y when the voltage of 50V is applied to the second scan electrode.

The paper then is again fed a distance equal to one dot pitch in the feeding direction and the process is repeated. This process continues until dots corresponding to all image data for each data memory are formed and the image has been formed on the paper 41. Thus, after the paper has been fed a distance equal to the number of scan electrodes 31, in this example a distance equal to 12 dots, then, on subsequent movements of the paper, it is possible that, as 50V are applied to each of the scan electrodes 31 in sequence, a voltage of 25V or 75V will be applied to the data electrodes 32 in order to pass a toner at the desired image locations.

As mentioned above, three colors of toner particles 23C, 23M and 23Y are attached in sequence onto the paper 41 in order to form the image by the application of 50V to the scan electrodes 31 in sequence and the selective application of 25 or 75V to the data electrodes 32. In the present embodiment, apertures 34 corresponding to each color are formed on the substrate 33 such that the apertures for each color are aligned with one another parallel to the feeding direction of the paper. Therefore, the dots formed by the apertures for each color in the straight line, which is parallel to the feeding direction of the paper, can be perfectly overlapped. As a result, a full color image with good quality is produced by accurately overlapping toner particles for each color. Further, since wires can be provided on one substrate, driving circuits for each color are commonly used so that it is possible to reduce the cost.

The paper 41 on which the image is formed is introduced into the thermal fixing portion 50 by the feeding guide 44 and the toner particle image is heated and fixed onto the paper 41 by the heat roller 51 and the pressure roller 53 so that the image is fixed onto the paper 41.

As is obvious from the above explanation, according to the recording electrode of the invention, the apertures for each color can be accurately positioned. As a result of that, a good image is produced because toner particles for each color are perfectly overlapped on each other.

The invention is not limited to the above mentioned embodiment. It should be understood that many changes and modifications may be made in the embodiment without departing from the scope of the invention.

For instance, in the present embodiment, three colors such as yellow, magenta and cyanogen are used for forming an image. However, it may be that four colors, such as yellow, magenta, cyanogen and black in order, are used to form the image. In this case, there is a need to provide individual apertures for the fourth color.

Moreover, in the present embodiment, the toner particle supply portion is provided above the aperture electrode 36. However, it may be that the toner particle supply portion is provided below the aperture electrode. In this case, the back electrode 35 must be provided above the aperture electrodes 36.

Further, in the present embodiment, the toner particles 23 are negatively charged. However, it may be that the toner particles are positively charged. In this case, since the charge blade 24 is made from material with negative charge property the voltage to be applied to the aperture electrode 36 and the back electrode 35 is changed.

Moreover, four scan electrodes are provided for each color in the present embodiment. However, the number of scan electrodes for each color may be at least one. In a similar manner as described in the above embodiment, four apertures corresponding to each color are provided on one data electrode. However, there is only the need to provide as many as apertures as there are scan electrodes.

What is claimed is:

1. A recording electrode, comprising:

a substrate having an insulative characteristic;

a plurality of first electrodes on one side of said substrate;

a plurality of apertures in said substrate which allow at least two different color, charged toner particles to pass therethrough, each of said plurality of apertures being controlled independently to pass through one of the at least two different color, charged toner particles, said recording electrode directly controlling the charged toner particles and selectively passing the charged toner particles through each aperture in order to record an image on a supporting medium fed toward a predetermined direction, wherein said plurality of apertures from at least two subsets of apertures, each subset of apertures passing exclusively one color of charged toner particles of the at least two different color, charged toner particles.

2. An image recording apparatus that employs at least two different colors to toner particles and uses a recording electrode, comprising:

an insulative substrate;

a plurality of parallel data electrodes on a first side of said insulative substrate;

a plurality of parallel scan electrodes on a second side of said insulated substrate; and a plurality of apertures for passing exclusively the corresponding color toner particles, each aperture passing through a one of said scan electrodes, the insulative substrate and a one of said data electrodes, wherein said plurality of apertures has at least two subsets of apertures, each subset of apertures corresponding to and passing one color of said at least two different colors of toner particles.

3. The image recording apparatus as claimed in claim 2, wherein said data electrodes are substantially transverse to said scan electrodes whereby said scan electrodes and said data electrodes define a matrix.

4. The image recording apparatus as claimed in claim 2, wherein the data electrodes present a sawtooth image when viewed in plan, said apertures for passing a particular color of toner particles positioned to be on a line having a predetermined angle to a feeding direction of a recording medium.

5. The image recording apparatus as claimed in claim 4, wherein a first aperture through each said data electrode for each color of toner lies along a line parallel to the feeding direction of the recording medium and each successive aperture of each color of toner lying along the line having a predetermined angle is aligned along a line parallel to the feed direction with a corresponding aperture of each other color of toner.

6. An image recording apparatus, comprising:

at least two toner cases, each toner case for storing toner particles of a different color;

a recording electrode having a substrate, a plurality of sets of control electrodes on one surface of the substrate, each of the sets of control electrodes corresponding to one of the colors, and a corresponding plurality of sets of toner passages formed adjacent to the substrate and the plurality of control electrodes, each of the sets of toner passages corresponding to one of the colors, wherein color, charged toner particles pass adjacent to each of the plurality of toner passages corresponding to one of the colors;

toner supplying means provided in each of said toner cases for supplying the toner particles toward said recording electrode; and a back electrode, wherein a supporting medium is fed between said recording electrode and said back electrode.

7. An image recording apparatus as claimed in claim 6, wherein the toner passages are a plurality of apertures.

8. An image recording apparatus as claimed in claim 6, further comprising heating means provided downstream in a supporting medium feeding direction from said recording electrode.

9. The recording electrode according to claim 1, further comprising a plurality of second electrodes on an opposite side of the side of said substrate, wherein each one of said plurality of apertures passes through a one of said plurality of first electrodes and a one of said plurality of second electrodes so as to form said at least two subsets of apertures.

10. The image recording apparatus according to claim 6, wherein each of the plurality of toner passages is controlled independently according to an image which is formed on the supporting medium.

* * * * *